United States Patent
Kinugasa et al.

(10) Patent No.: US 8,446,118 B2
(45) Date of Patent: May 21, 2013

(54) ROTARY ELECTRIC MACHINE CONTROL DEVICE

(75) Inventors: Seiichi Kinugasa, Kariya (JP); Jin Izawa, Obu (JP); Kazuyuki Izawa, Okazaki (JP); Kazuo Aoki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 602 days.

(21) Appl. No.: 12/656,274

(22) Filed: Jan. 22, 2010

(65) Prior Publication Data

US 2010/0244755 A1 Sep. 30, 2010

(30) Foreign Application Priority Data

Mar. 30, 2009 (JP) ................. 2009-082095

(51) Int. Cl.
*H02P 7/00* (2006.01)
(52) U.S. Cl.
USPC ...... 318/432; 318/400.23; 318/430; 318/721; 318/437
(58) Field of Classification Search
USPC .......... 318/114, 400.01, 400.02, 400.07, 318/400.15, 400.23, 400.24, 721, 799, 430, 318/432, 434, 437, 375, 376, 801, 727, 715, 318/701, 771; 363/46
See application file for complete search history.

(56) References Cited

U.S. PATENT DOCUMENTS

| | | | | |
|---|---|---|---|---|
| 6,927,548 B2 * | 8/2005 | Nishizaki et al. | ............. | 318/432 |
| 7,474,067 B2 * | 1/2009 | Ueda et al. | ................... | 318/432 |
| 7,659,686 B2 * | 2/2010 | Osada et al. | .................. | 318/771 |
| 7,768,220 B2 * | 8/2010 | Schulz et al. | ................. | 318/432 |
| 7,952,308 B2 * | 5/2011 | Schulz et al. | ............. | 318/400.23 |
| 7,986,116 B2 * | 7/2011 | Imura et al. | ............. | 318/400.15 |
| 8,080,957 B2 * | 12/2011 | Miura et al. | ............. | 318/400.23 |
| 2008/0067960 A1 * | 3/2008 | Maeda et al. | ............ | 318/400.02 |
| 2009/0251087 A1 | 10/2009 | Takei | | |

FOREIGN PATENT DOCUMENTS

| | | |
|---|---|---|
| JP | A 11-55986 | 2/1999 |
| JP | A 2003-88159 | 3/2003 |
| JP | A 2005-224051 | 8/2005 |
| JP | A 2007-274779 | 10/2007 |
| WO | WO 2008/108292 A1 | 9/2008 |

OTHER PUBLICATIONS

International Search Report mailed Mar. 30, 2010 for PCT/JP2010/051882.

* cited by examiner

*Primary Examiner* — Antony M Paul
(74) *Attorney, Agent, or Firm* — Oliff & Berridge, PLC

(57) ABSTRACT

A rotary electric machine control device includes a positive/negative determination section that determines whether an output torque of the rotary electric machine is positive or negative; a correction parameter setting section that sets as a correction parameter a phase difference of a sinusoidal ripple correction wave for reducing torque ripple of the rotary electric machine with respect to a magnetic pole position of the rotary electric machine depending on whether the output torque is positive or negative; and a correction wave generation section that generates the ripple correction wave on the basis of the correction parameter.

10 Claims, 6 Drawing Sheets

ROTARY ELECTRIC MACHINE CONTROL DEVICE

INCORPORATION BY REFERENCE

The disclosure of Japanese Patent Application No. 2009-082095 filed on Mar. 30, 2009 including the specification, drawings and abstract is incorporated herein by reference in its entirety.

BACKGROUND

The present invention relates to a rotary electric machine control device that controls driving of a rotary electric machine that drives a vehicle.

In a motor that utilizes permanent magnets, some magnetic flux produced by the permanent magnets remains even in the case where no current is caused to flow through a coil that produces a revolving magnetic field. This produces torque ripple between the permanent magnets and an iron core of the coil. Japanese Patent Application Publication No. JP-A-2003-88159 discloses a technique that focuses on the fact that the frequency of torque ripple is an integer multiple of the electrical angle of the motor and that suppresses variations by adding to a torque command a sinusoidal wave at any frequency that is an integer multiple of the electrical angle of the motor, any amplitude, and any phase as a torque ripple correction amount.

SUMMARY

Because torque ripple in theory appears as pulsations having harmonic-wave components related to the number of poles of the permanent magnets and the number of salient poles of the iron core, torque ripple can be suppressed by the technique disclosed in Japanese Patent Application Publication No. JP-A-2003-88159. A type of motor called a synchronous motor employs a reluctance torque produced by variations in magnetic energy due to the position of the self-inductance, in addition to a magnet torque produced as a product of the flux linkage formed by the magnetic field of the permanent magnets and the current flowing through the coil. The self-inductance is a variable value. For example, the self-inductance varies in the case where the coil current increases in accordance with the output torque and the rotational speed to cause a magnetic saturation. The self-inductance also varies when the magnetic resistance varies in accordance with the rotational angle of a rotor of the motor. This is also a factor for high-order harmonic-wave components to be superimposed on torque ripple. Thus, the torque ripple correction amount should be set appropriately in accordance with the rotational state of the motor or the like. If the torque ripple correction amount is less consistent, a torque ripple suppression effect is limited. While Japanese Patent Application Publication No. JP-A-2003-88159 discloses that a sinusoidal wave as the torque ripple correction amount can be set freely, it does not suggest any specific method for determining the torque ripple correction amount. Therefore, there is desired a further technique for achieving a favorable torque ripple suppression effect.

In consideration of the fact that the self-inductance varies non-linearly and of the resolution of PWM control used for general motor control, it is not practical to suppress torque ripple by calculating an exact correction amount for produced torque ripple. Therefore, it is necessary to obtain an appropriate torque ripple correction amount in accordance with the rotational state of the motor as a rotary electric machine or the like, without unnecessarily increasing the scale of the construction of a rotary electric machine control device which controls the motor or significantly increasing the computational load.

The present invention has been contrived in view of the foregoing issues, and therefore has an object to provide a rotary electric machine control device with a simple configuration and capable of appropriately suppressing torque ripple in accordance with the rotational state of a rotary electric machine.

In order to achieve the foregoing object, in a characteristic structure of a rotary electric machine control device according to a first aspect of the present invention that controls driving of a rotary electric machine that drives a vehicle, the rotary electric machine includes: a positive/negative determination section that determines whether an output torque of the rotary electric machine is positive or negative; a correction parameter setting section that sets as a correction parameter a phase difference of a sinusoidal ripple correction wave for reducing torque ripple of the rotary electric machine with respect to a magnetic pole position of the rotary electric machine depending on whether the output torque is positive or negative; and a correction wave generation section that generates the ripple correction wave on the basis of the correction parameter, in which the rotary electric machine is controlled to drive using the ripple correction wave.

As discussed above with reference to Japanese Patent Application Publication No. JP-A-2003-88159, torque ripple can be suppressed by adding to a torque command a sinusoidal wave according to the torque ripple as a torque ripple correction amount. In order to obtain a high suppression effect, it is required to set the torque ripple correction amount in accordance with the rotational state of a rotary electric machine as discussed above. The inventors have discovered that in the case where a rotary electric machine is used as a driving source of a vehicle, different torque ripple is produced depending on whether the vehicle is traveling forward or backward and whether the vehicle is in power running or regeneration. For example, torque ripple with different characteristics may be produced because of variations in characteristics of a mount rubber in a support portion that supports the rotary electric machine on the vehicle body or the structure of a drive/transmission system from the rotary electric machine to the wheels. An appropriate ripple correction wave according to produced torque ripple can be obtained by generating a ripple correction wave at a different phase depending on whether an output torque is positive or negative as in the characteristic configuration. The torque ripple can be suppressed favorably by controlling the rotary electric machine to drive using the ripple correction wave. Thus, according to the characteristic configuration, it is possible to provide a rotary electric machine control device capable of appropriately suppressing torque ripple in accordance with the rotational state of a rotary electric machine. The output torque may be a torque actually output from a rotary electric machine, a torque estimated on the basis of a current value or the like, or a required torque provided from a higher system.

The rotary electric machine control device according to a second aspect of the present invention may further include a required torque setting section that determines a required torque for the rotary electric machine on the basis of at least an operation amount of an accelerator pedal, and the rotary electric machine may be controlled to drive on the basis of a target torque obtained by superimposing the ripple correction wave on the required torque.

Because the rotary electric machine is controlled on the basis of a target torque obtained by superimposing the torque ripple correction wave on the required torque for the rotary electric machine, it is possible to appropriately suppress torque ripple while controlling the torque of the rotary electric machine as required by a driver.

In the rotary electric machine control device according to a third aspect of the present invention, the correction parameter setting section may further set an amplitude of the ripple correction wave depending on whether the output torque is positive or negative.

Torque ripple contains a sinusoidal-wave component at a certain phase and a certain amplitude. Because the amplitude is associated with the magnitude of vibration, the magnitude of torque ripple of the rotary electric machine can be appropriately attenuated by setting the ripple correction wave at an appropriate amplitude. A higher effect for suppressing produced torque ripple can be obtained by setting the amplitude of the ripple correction wave depending on whether the output torque is positive or negative as in this configuration.

In the rotary electric machine control device according to a fourth aspect of the present invention, the correction parameter setting section may set the amplitude of the ripple correction wave in accordance with a rotational speed of the rotary electric machine.

A discomfort that torque ripple causes to occupants of the vehicle is relevant to the speed of the vehicle, that is, the rotational speed of the rotary electric machine. Thus, when the amplitude of the ripple correction wave is set in accordance with the rotational speed of the rotary electric machine, superimposition of the ripple correction wave suppresses the possibility that the efficiency of the rotary electric machine reduces to improve the efficiency of the rotary electric machine. That is, it is possible to both reduce torque ripple and suppress a reduction in efficiency of the rotary electric machine.

In the rotary electric machine control device according to a fifth aspect of the present invention, the correction parameter setting section may restrict the amplitude of the ripple correction wave such that the amplitude of the ripple correction wave becomes smaller as the rotational speed of the rotary electric machine becomes higher since the rotational speed exceeds a restriction start speed until the amplitude of the ripple correction wave becomes zero at a restriction speed higher than the restriction start speed, and such that the amplitude of the ripple correction wave is restricted to zero when the rotational speed of the rotary electric machine is equal to or higher than the restriction speed.

The occupants of the vehicle tend to feel more uncomfortable about torque ripple when the speed of the vehicle is low, that is, when the rotational speed of the rotary electric machine is low. Thus, it is possible to suppress such a discomfort due to generation of torque ripple and to use the rotary electric machine with a high efficiency by setting the amplitude of the ripple correction wave to be large when the rotational speed of the rotary electric machine is low and reducing the amplitude as the rotational speed becomes higher. When the rotational speed of the rotary electric machine is equal to or higher than the restriction speed, no discomfort is caused by torque ripple. Thus, in such a high-speed region, the rotary electric machine can be utilized with a high efficiency by setting the amplitude to zero in order not to substantially apply no ripple correction wave. Because the amplitude of the ripple correction wave is reduced as the rotational speed rises from the restriction start speed to the restriction speed, the torque ripple correction amount does not vary abruptly to cause a discomfort to the occupants.

DETAILED DESCRIPTION OF EMBODIMENTS

Figure 1:
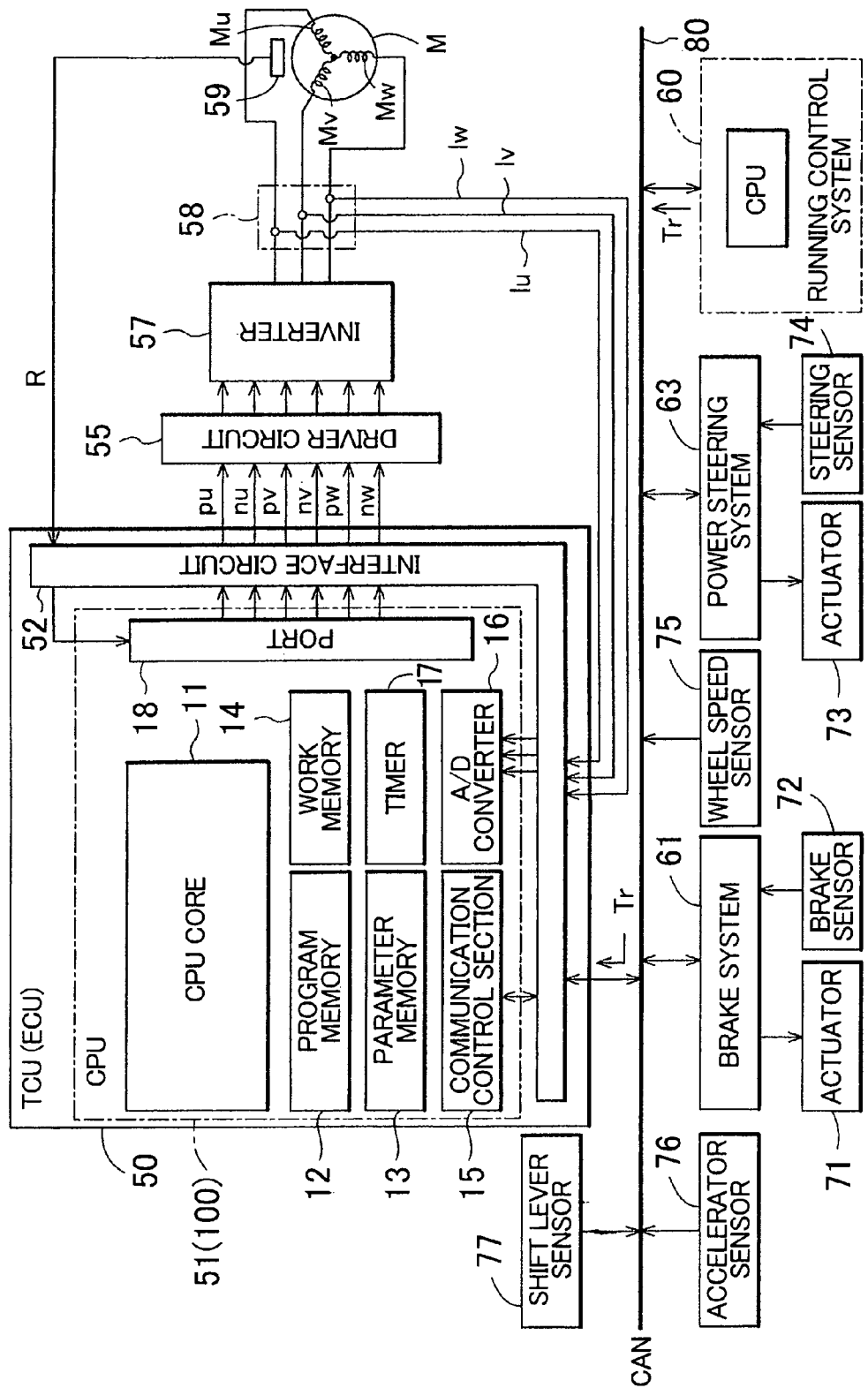
FIG. 1 is a block diagram schematically showing an exemplary system configuration for a vehicle including a rotary electric machine control device according to the present invention.

A rotary electric machine control device according to an embodiment of the present invention will be described below with reference to the drawings, taking as an example a control device that controls a motor (rotary electric machine) which serves as a driving source of a vehicle such as a hybrid vehicle or an electric vehicle. FIG. 1 is a block diagram schematically showing an exemplary system configuration for a vehicle including a control device (rotary electric machine control device) 100 for a motor M. The motor M is electrically connected via an inverter 57 to a battery (not shown) or a converter (not shown) that boosts the output voltage of the battery. The motor M is supplied with electricity to produce a driving force. The inverter 57 includes a plurality of switching elements. The switching elements are preferably IGBTs (insulated gate bipolar transistors) or MOSFETs (metal oxide semiconductor field effect transistors). In the following description, IGBTs are used as the switching elements.

As well known, the inverter 57 is formed by a three-phase bridge circuit. Two IGBTs are connected in series between the input plus side and the input minus side of the inverter 57, and three such series circuits are connected in parallel. That is, the three series circuits of the bridge circuit respectively correspond to stator coils Mu, Mv, and Mw of the motor M which respectively correspond to u-phase, v-phase, and w-phase. The collector of an IGBT in the upper stage for each phase is connected to the input plus side of the inverter 57, and the emitter of the IGBT is connected to the collector of an IGBT in the lower stage for the corresponding phase. The emitter of the IGBT in the lower stage for each phase is connected to the input minus side of the inverter 57 (for example, the ground). The middle points of the series circuits, each formed by a pair of IGBTs, for the respective phases, that is, the connection points of the IGBTs, are respectively connected to the stator coils Mu, Mv, and Mw of the motor M.

A flywheel diode (regeneration diode) is connected in parallel to each IGBT. The flywheel diode is connected in parallel to each IGBT in a manner such that a cathode terminal of the flywheel diode is connected to the collector terminal of the IGBT and an anode terminal is connected to the emitter terminal of the IGBT. The gate of each IGBT is connected to an ECU (electronic control unit) 50 via a driver circuit 55 to be individually subjected to switching control. In the embodiment, the ECU 50 is referred to as a TCU (trans-axle control unit) 50 for differentiation from other ECUs.

The TCU 50 is formed by a logic circuit such as a microcomputer as a core component thereof. In the embodiment, the TCU 50 includes a CPU (central processing unit) 51 which is a microcomputer, an interface circuit 52, and other surrounding circuits. The interface circuit 51 is formed by an EMI (electro-magnetic interference)-proof component, a buffer circuit, etc. The CPU 51 forms the control device 100 which corresponds to the rotary electric machine control device according to the present invention. A drive signal to be input to the gate of an IGBT or an MOSFET which switches a high voltage requires a higher voltage than the drive voltage of a general electronic circuit such as a microcomputer. Therefore, the drive signal is boosted in voltage via the driver circuit 55, and then input to the inverter 57.

The CPU 51 at least includes a CPU core 11, a program memory 12, a parameter memory 13, a work memory 14, a communication control section 15, an A/D converter 16, a timer 17, and a port 18. The CPU core 11 is a core component of the CPU 51, and includes an instruction register, an instruction decoder, an ALU (arithmetic logic unit) that principally executes various computations, a flag register, a multi-purpose register, and an interrupt controller. The program memory 12 is a nonvolatile memory that stores a motor control program (rotary electric machine control program). The parameter memory 13 is a nonvolatile memory that stores various parameters to be referenced during execution of the program. The parameter memory 13 may be constructed integrally with the program memory 12. The program memory 12 and the parameter memory 13 are preferably formed by a flash memory, for example. The work memory 14 is a memory that temporarily stores temporary data generated during execution of the program. The work memory 14 may be a volatile memory. The work memory 14 is formed by a DRAM (dynamic RAM) or an SRAM (static RAM) that enables high-speed reading and writing of data.

The communication control section 15 controls communication with other systems in the vehicle. In the embodiment, the communication control section 15 controls communication with the running control system 60 and other systems and sensors via a CAN (controller area network) 80 in the vehicle. The A/D converter 16 converts an analog electric signal into digital data. In the embodiment, the A/D converter 16 receives from a current sensor 58 detection results of motor currents Iu, Iv, and Iw respectively flowing through the stator coils Mu, Mv, and Mw of the motor M, and converts the detection results into digital values. Because the three phases, namely u-phase, v-phase, and w-phase, are balanced so that the instantaneous value thereof is zero, currents for only two phases may be detected and a current for the remaining phase may be computed in the CPU 51. In the embodiment, currents for all the three phases are detected. While the A/D converter 16 is shown as having three analog inputs in the illustrated embodiment, this is merely intended to clearly indicate that currents for the three phases are measured, and the A/D converter 16 does not necessarily have three inputs. For example, the interface circuit 52 may include a multiplexer to acquire analog current values from one analog input in a time-sharing manner.

The timer 17 counts the time using the clock cycle of the CPU 51 as the minimum resolution. For example, the timer 17 monitors the execution cycle of the program to inform the interrupt controller of the CPU core 11 of the monitoring results. The timer 17 also measures the effective periods of gate drive signals (pu, nu, pv, nv, pw, nw) for driving the IGTBs to generate the gate drive signals.

The port 18 is a terminal control section that outputs the gate drive signals for the IGBTs of the inverter 57 or the like via a terminal of the CPU 51 and that receives a rotation detection signal R input from a rotation detection sensor 59 to the CPU 51. The rotation detection sensor 59 is a sensor installed in the vicinity of the motor M to detect the rotational position or the rotational speed of the rotor of the motor M. The rotation detection sensor 59 is formed using a resolver, for example.

As discussed above, the CPU 51 is communicably connected to various systems and sensors via the CAN 80 which is an in-vehicle network. The CPU 51 is also connected a brake system 61 and a power steering system 63 in addition to the running control system 60. Each of these systems is formed by an electronic circuit such as a CPU as its core component as with the control device 100 for the motor M, and is formed as an ECU (electronic control unit) with surrounding circuits as with the TCU 50.

The brake system 61 is an electric brake system having a brake assist function for detecting the amount of operation of a brake pedal performed by a driver with a brake sensor 72 and applying a braking force to the vehicle via an actuator 71 to reinforce a brake force. The power steering system 63 is, for example, an electric power steering (EPS) system that detects the amount of operation of a steering wheel performed by the driver with a steering sensor 74 to apply an assist torque with an actuator 73.

A wheel speed sensor 75 is a sensor that detects the amount of rotation or the rotational speed per unit time of a wheel of the vehicle. In the case where the brake system 61 is an ABS (anti-lock braking system) that suppresses locking of the brake and/or an electronic stability control (ESC) system that suppresses skidding of the vehicle during cornering, the brake system 61 executes various control on the basis of detection results of the wheel speed sensor 75 received via the CAN 80. For example, the brake system 61 determines a sign of brake locking, wheel slipping, and skidding on the basis of the difference in rotational speed between the left and right wheels to execute control in accordance with the determination results. Thus, the wheel speed sensor 75 may be provided in the brake system 61.

An accelerator sensor 76 is a sensor that detects the amount of operation of an accelerator pedal performed by the driver. A shift lever sensor 77 is a sensor or a switch that detects the position of a shift lever. The running control system 60 computes a required torque Tr for the motor M on the basis of the detection results of the brake sensor 72, the accelerator sensor 76, the shift lever sensor 77, the wheel speed sensor 75, and so forth. For example, when the accelerator pedal is depressed with the shift lever sensor 77 detecting that the shift lever is set to the "Drive" position, the running control system 60 computes the required torque Tr (output torque) with a positive value. On the other hand, when the brake pedal is depressed or when the accelerator pedal is depressed with the shift lever sensor 77 detecting that the shift lever is set to the "Reverse" position, the running control system 60 computes the required torque Tr (output torque) with a negative value. The required torque Tr is transmitted to the CPU 51 via the CAN 80 to be received by the communication control section 15 of the CPU 51. The running control system 60 functions as a required torque setting section that determines the required torque Tr for the motor M on the basis of at least the operation amount of the accelerator pedal.

In the embodiment, the control device 100 for the motor M includes the CPU 51 as a core component thereof. That is, the control device 100 includes hardware including the CPU core 11 as a main component, the work memory 14, and the timer 17, and software such as programs and parameters stored in the program memory 12 and the parameter memory 13, with the hardware and the software cooperating with each other. The control device 100 is not limited to such implementation through cooperation of hardware and software, and may be implemented by only hardware utilizing an ASIC (application specific integrated circuit) or the like.

Figure 2:
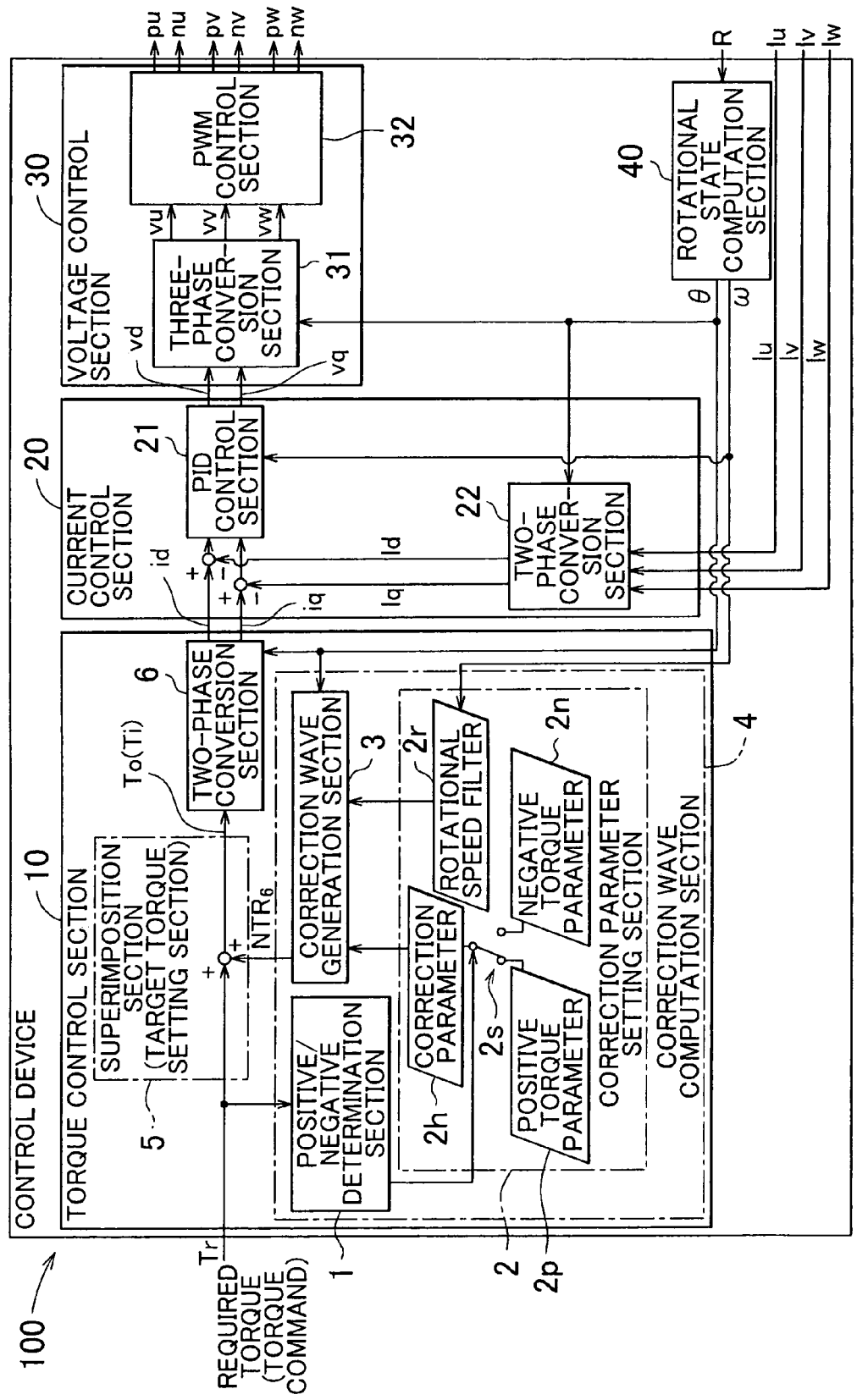
FIG. 2 is a block diagram schematically showing an exemplary configuration of the rotary electric machine control device according to the present invention.

FIG. 2 is a block diagram schematically showing an exemplary functional configuration of the control device 100 for the motor M. It is a matter of course that respective functional sections shown in the drawing may be implemented by only hardware or through cooperation of hardware and software. The respective functional sections may be implemented in any form as long as functions of the functional sections are realized. As shown in FIG. 2, the control device 100 includes a torque control section 10, a current control section 20, a voltage control section 30, and a rotational state computation section 40.

A control method called vector control (field oriented control: FOC) is known as a method for controlling an AC motor. In the vector control, coil currents flowing through respective stator coils of the AC motor for three phases are subjected to coordinate conversion into vector components in a d-axis, which is the direction of the magnetic field produced by the permanent magnet disposed in the rotator, and a q-axis, which is perpendicular to the d-axis, to perform feedback control. The vector control is adopted also in the embodiment.

In coordinate conversion performed in the vector control, it is necessary to know the rotational state of the motor M in real time. Thus, the rotation detection sensor 59 such as a resolver is provided in the vicinity of the motor M as shown in FIG. 1. The detection results of the rotation detection sensor 59 are transmitted to a register in the CPU core 11 or the work memory 14 via the port 18 of the CPU 51 as discussed above. The rotational state computation section 40 provided in the control device 100 calculates the rotor position (electrical angle $\theta$) and the rotational speed (angular speed $\omega$) on the basis of detection results R of the rotation detection sensor 59. The electrical angle $\theta$ and the angular speed $\omega$ thus calculated are used in the torque control section 10, the current control section 20, and the voltage control section 30. In the case where the rotation detection sensor 59 such as a resolver provides information such as the rotor position and the rotational speed in such a form that can be utilized by the control device 100 for computation, the rotational state computation section 40 may not be provided in the control device 100.

The torque control section 10 is a functional section that sets motor currents (current commands) id and iq for current feedback control in accordance with the required torque Tr (torque command Ti). The target currents id and iq are set for the d-axis and the q-axis discussed above. Therefore, the torque control section 10 includes a two-phase conversion section 6 that performs coordinate conversion of the torque command Ti into a d-axis target current id and a q-axis target current iq on the basis of the electrical angle $\theta$ calculated by the rotational state computation section 40. Normally, the required torque Tr is the same as the torque command Ti. In the embodiment, however, a superimposition section 5 is provided that superimposes a ripple correction wave $NTR_6$ on the required torque Tr to generate a target torque To in order to suppress torque ripple. The target torque To is input to the two-phase conversion section 6 as the torque command Ti. Therefore, the superimposition section 5 may be considered to function as a target torque setting section that sets the target torque To. The ripple correction wave $NTR_6$ and a method for generating the ripple correction wave $NTR_6$ will be discussed later.

The current control section 20 is a functional section that performs proportional-integral control (PI control) or proportional-integral-derivative control (PID control), for example, on the basis of the deviation between the target currents id and iq and motor currents obtained through feedback to set target voltages (voltage commands) vd and vq. In the illustrated embodiment, proportional-integral-derivative control (PID control) is performed, and the current control section 20 includes a PID control section 21 and a two-phase conversion section 22. The current values detected by the current sensor 58 correspond to three-phase currents Iu, Iv, and Iw. Therefore, the two-phase conversion section 22 performs coordinate conversion of the current values into two-phase currents Id and Iq on the basis of the electrical angle $\theta$ calculated by the rotational state computation section 40. The PID control section 21 performs PID control on the basis of the deviation between the target currents id and iq and the two-phase motor currents Id and Iq and the angular speed $\omega$ calculated by the rotational state computation section 40 to set the target voltages vd and vq.

The voltage control section 30 generates gate drive signals pu, nu, pv, nv, pw, and nw for driving the IGBTs of the inverter 57 for three phases on the basis of the target voltages vd and vq. The voltage control section 30 includes a three-phase conversion section 31 and a PWM control section 32. The inverter 57 is provided for three phases in correspondence with the stator coils Mu, Mv, and Mw of the motor M for three phases. Therefore, the target voltages vd and vq for two phases are subjected to coordinate conversion into target voltages vu, vv, and vw for three phases on the basis of the electrical angle $\theta$ calculated by the rotational state computation section 40. The PWM control section 32 performs PWM (pulse width modulation) control of the IGBTs of the inverter 57.

Specifically, the PWM control section 32 generates six gate drive signals pu, nu, pv, nv, pw, and nw for individually controlling the gates of the total of six IGBTs provided for three phases, for each of which IGBTs are provided in two stages, namely an upper stage and a lower stage. The gate drive signals pu, nu, pv, nv, pw, and nw respectively correspond to IGBTs in the upper stage for the u-phase, in the lower stage for the u-phase, in the upper stage for the v-phase, in the lower stage for the v-phase, in the upper stage for the w-phase, and in the lower stage for the w-phase. The timer 17 of the CPU 51 counts the effective periods of the respective gate drive signals to output pulsed gate drive signals pu, nu, pv, nv, pw, and nw via the port 18.

As discussed above, in a motor that utilizes permanent magnets, some magnetic flux produced by the permanent magnets remains even in the case where no current is caused to flow through a coil that produces a revolving magnetic field. This produces torque ripple between the permanent magnets and an iron core of the coil. Torque ripple contains harmonic-wave components of a fundamental-wave component of a 3-phase AC which drives the motor. The orders of the harmonic-wave components are related to the number of poles of the permanent magnets and the number of salient poles of the iron core. In general 3-phase AC motors, it is often the case that the number of slots per pole is 6, and that the most influential one of harmonic waves is the sixth harmonic wave. For example, in a motor in which one-fourth rotation (mechanical angle of 90°) of the rotor corresponds to an electrical angle of 360°, it is often the case that the number of poles is 8 and the number of slots is 48, and that the most influential harmonic waves are the sixth harmonic waves.

Figure 3:
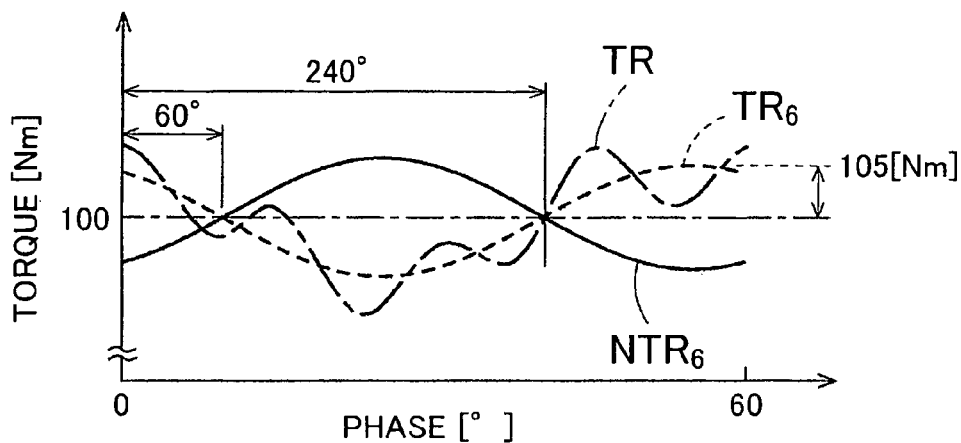
FIG. 3 is a waveform chart schematically showing the relationship between harmonic-wave components of torque ripple and a ripple correction wave.

FIG. 3 shows waveforms of harmonic-wave components of torque ripple obtained by the inventors through FFT (fast Fourier transform) analysis and FEM (finite element method) analysis. In FIG. 3, the horizontal axis represents the phase, and a period equivalent to electrical angles of 0° to 60° of the AC fundamental wave which drives the motor M is extracted. The point at an electrical angle of 0° is used as a reference phase. A waveform TR shown in FIG. 3 indicates torque ripple. In the example, an ideal torque is a constant value of 100 [Nm], and the torque ripple TR is superimposed on the ideal torque as an AC component. As is clear from FIG. 3, the torque ripple TR has a waveform obtained by synthesizing various high-order harmonic-wave components. A waveform $TR_6$ shown in FIG. 3 is obtained by extracting a sixth harmonic-wave component, which is the largest frequency component of the torque ripple TR, through FFT analysis and FEM analysis.

The waveform $TR_6$ is a sixth harmonic wave of the fundamental wave. Therefore, one full cycle of the waveform $TR_6$ is contained in a range of electrical angles of 0° to 60° of the AC fundamental wave. The phase of the waveform $TR_6$ is delayed by 240° (or advanced by 120°) from the reference phase which corresponds to an electrical angle of 0° of the AC fundamental wave, for example. The amplitude of the waveform $TR_6$ is 105 [Nm], which is a 5% increase from the steady-state value of 100 [Nm]. In order to cancel the sixth harmonic-wave component $TR_6$ of the torque ripple TR, it is conceivable to use a sinusoidal wave at the opposite phase as shown in FIG. 3. A sinusoidal wave at the opposite phase to the sixth harmonic-wave component $TR_6$ of the torque ripple TR is referred to as a ripple correction wave $NTR_6$. Because the ripple correction wave $NTR_6$ is at the opposite phase to the sixth harmonic-wave component $TR_6$ of the torque ripple TR, the phase of the ripple correction wave $NTR_6$ is delayed by 60° (or advanced by 300°) from the reference phase which corresponds to an electrical angle of 0° of the AC fundamental wave. It is further preferable that the ripple correction wave $NTR_6$ is a sinusoidal wave at the opposite phase to and at the same amplitude as the sixth harmonic-wave component $TR_6$ of the torque ripple TR. The sixth harmonic-wave component $TR_6$ of the torque ripple TR can be removed by adding the ripple correction wave $NTR_6$ to the torque ripple TR. The reference phase is not limited to that used in the example, and may be set to another phase.

As described with reference to FIG. 3, it is possible to cancel the sixth harmonic-wave component $TR_6$ of the torque ripple TR produced, and to suppress pulsations of the motor M, by generating a ripple correction wave $NTR_6$ with the defined phase and amplitude and superimposing the ripple correction wave $NTR_6$ on the required torque Tr. A suitable target torque To is set by generating a ripple correction wave $NTR_6$ with the defined phase and amplitude in a correction wave computation section 4 shown in FIG. 2 and superimposing the ripple correction wave $NTR_6$ on the required torque Tr in the superimposition section 5.

Figure 4:
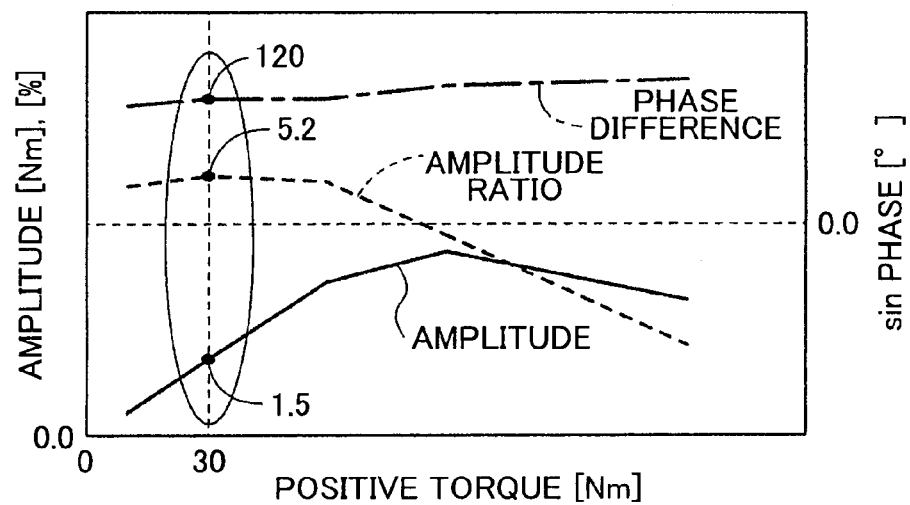
FIG. 4 is a graph showing the phase and amplitude characteristics of torque ripple at the time of positive torque.
Figure 5:
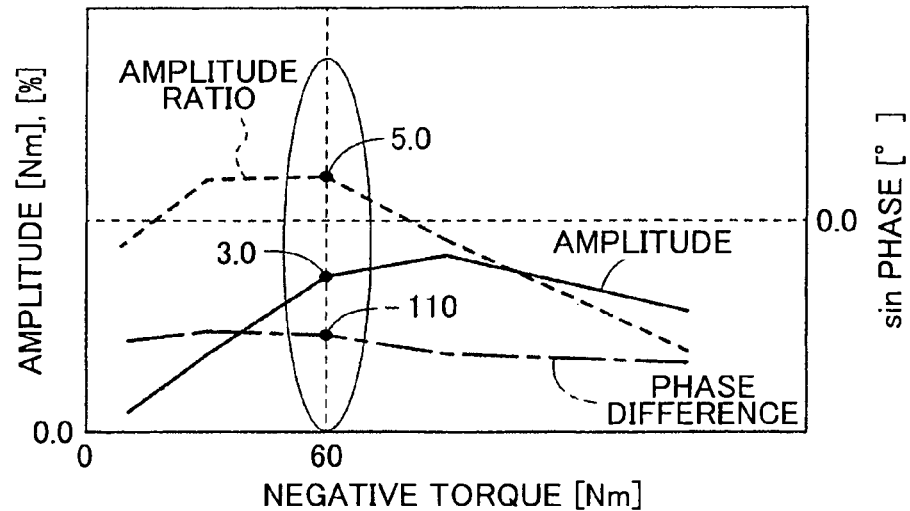
FIG. 5 is a graph showing the phase and amplitude characteristics of torque ripple at the time of negative torque.

According to experiments performed by the inventors, in the case where the motor M was used as a driving source of a vehicle, the motor M exhibited different characteristics of the torque ripple TR depending on whether it outputted a positive torque or a negative torque. FIG. 4 is a graph showing the characteristics of the phase and the amplitude of the sixth harmonic-wave component $TR_6$ of the torque ripple TR at the time when the motor M outputs a positive torque such as when the vehicle travels forward. FIG. 5 is a graph showing the characteristics of the phase and the amplitude of the sixth harmonic-wave component $TR_6$ of the torque ripple TR at the time when the motor M outputs a negative torque such as when the vehicle travels backward or when generative braking is performed. In the graphs, the horizontal axis represents the absolute value of the torque, the left vertical axis represents the absolute value of the amplitude and the amplitude ratio representing the proportion (percentage) of the amplitude to the steady-state value, and the right vertical axis represents the phase.

As shown in FIGS. 4 and 5, the phase difference of the sixth harmonic-wave component $TR_6$ of the torque ripple TR with respect to the reference phase is generally stable irrespective of the absolute value of the torque. However, the phase difference at the time of a positive torque is about 110° to 135°, which is different from the phase difference at the time of a negative torque, which is −108° to −138°.

Meanwhile, as shown in FIGS. 4 and 5, the amplitude of the sixth harmonic-wave component $TR_6$ of the torque ripple TR varies significantly in accordance with the absolute value of the torque. When the torque ripple TR is produced, the senses of the driver and occupants on board the vehicle are affected more by the proportion of the amplitude to the steady-state value than by the absolute value of the amplitude of the torque ripple TR ($TR_6$). Thus, focus is given to a torque value at which the proportion of the amplitude of the torque ripple TR ($TR_6$) to the steady-state value (amplitude ratio) is largest. In the case of a positive torque, the amplitude ratio is maximum when the absolute value of the torque is 30 [Nm] as shown in FIG. 4. Meanwhile, in the case of a negative torque, the amplitude ratio is maximum when the absolute value of the torque is 60 [Nm] as shown in FIG. 5. Thus, the torque value at which the proportion of the amplitude of the torque ripple TR ($TR_6$) to the steady-state value (amplitude ratio) is largest is different depending on whether the torque of the motor M is a positive torque or a negative torque.

As described above, the characteristics of the torque ripple TR are different depending on whether the motor M outputs a positive torque or a negative torque. Thus, the control device 100 sets the phase and the amplitude of a ripple correction wave $NTR_6$ to be generated depending on whether the required torque Tr is positive or negative. Specifically, as shown in FIG. 2, the correction wave computation section 4 of the torque control section 10 includes a positive/negative determination section 1, a correction parameter setting section 2, and a correction wave generation section 3. The positive/negative determination section 1 is a functional section that determines whether the required torque Tr (output torque) is positive or negative. The correction parameter setting section 2 is a functional section that sets the phase difference of the ripple correction wave with respect to the reference phase as a correction parameter depending on whether the required torque Tr (output torque) is positive or negative. The correction parameter setting section 2 includes a select switch 2s that selects one of a positive torque parameter 2p and a negative torque parameter 2n. The select switch 2s is controlled on the basis of the determination results of the positive/negative determination section 1 so that the positive torque parameter 2p or the negative torque parameter 2n is set as a correction parameter 2h. The correction wave generation section 3 generates a ripple correction wave $NTR_6$ on the basis of the correction parameter 2h.

As discussed above, referring to FIG. 4, in the case where the motor M outputs a positive torque, the amplitude ratio is maximum at 5.2% when the absolute value of the torque is 30 [Nm]. At this time, the absolute value of the amplitude is 1.5 [Nm], and the phase difference is 120°. The amplitude ratio of 5.2% is defined as a correction parameter A for the amplitude (amplitude parameter). Since the ripple correction wave $NTR_6$ is an inverse of the sixth harmonic-wave component $TR_6$ of the torque ripple TR, a value obtained by the following formula (1) is defined as a correction parameter $\phi$ for the phase difference (phase difference parameter).

$$\phi = 120 - 180 = -60 [°] \quad (1)$$

As discussed above and with reference to FIG. 5, in the case where the motor M outputs a negative torque, the amplitude ratio is maximum at 5.0% when the absolute value of the torque is 60 [Nm]. At this time, the absolute value of the amplitude is 3.0 [Nm], and the phase difference is −110°. The amplitude ratio of 5.0% is defined as the correction parameter A for the amplitude (amplitude parameter). Since the ripple correction wave $NTR_6$ is an inversion of the sixth harmonic-wave component $TR_6$ of the torque ripple TR, the sign of the torque which is minus is automatically inverted. Thus, the above phase difference−110° is defined as the correction parameter (phase difference parameter) $\phi$.

In the embodiment, one value is selected for each correction parameter depending on whether the torque is positive or negative. However, the present invention is not limited thereto, and a plurality of values may be set for each correction parameter in each case where the torque is positive or negative. For example, a plurality of values may be set for each correction parameter in accordance with the absolute value of the torque.

Figure 6:
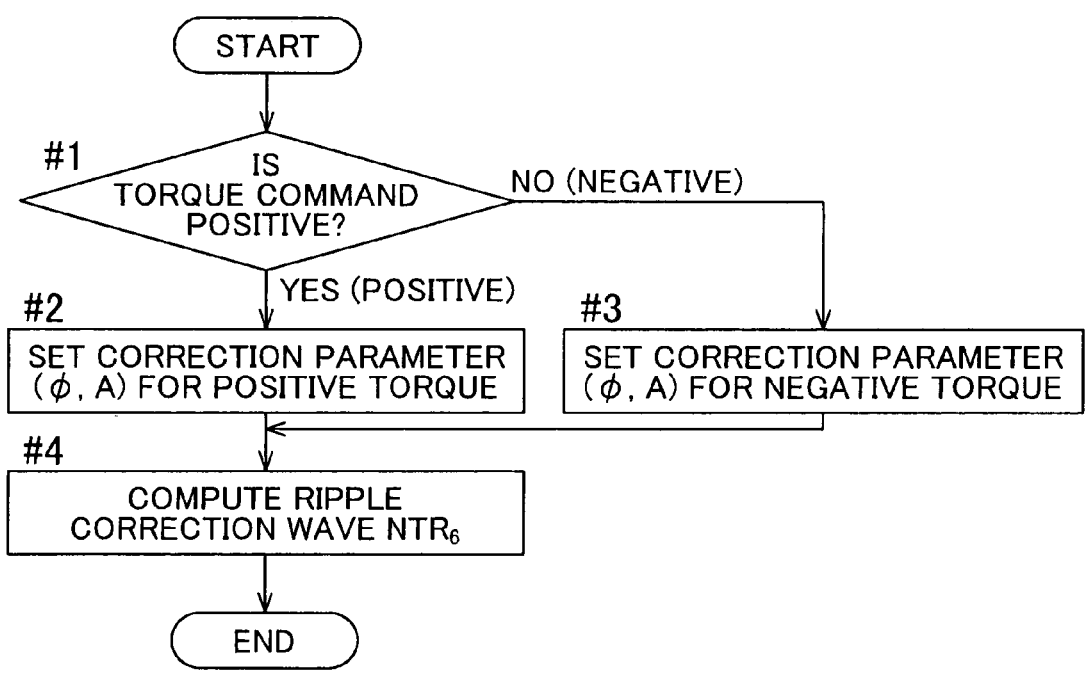
FIG. 6 is a flowchart showing an exemplary procedure for generating a ripple correction wave.

Now, the procedure for generating a ripple correction wave $NTR_6$ will be described with additional reference to the flowchart of FIG. 6. As discussed above, after receiving the required torque Tr from the running control system 60, the CPU 51 temporarily stores the required torque Tr in a work area such as a multi-purpose register of the CPU core 11 or the work memory 14. Then, the CPU core 11 references the work area to execute a positive/negative determination function for determining whether the required torque Tr for the motor M is positive or negative (positive/negative determination process #1).

Next, the CPU core 11 executes a correction parameter setting function for setting the phase difference of a ripple correction wave $NTR_6$ with respect to the reference phase as a correction parameter (phase difference parameter $\phi$) 2h depending on whether the required torque Tr is positive or negative (correction parameter setting processes #2 and #3). The correction parameter setting function may include a function for setting a correction parameter (amplitude parameter A) 2h that defines the amplitude of the ripple correction wave $NTR_6$. In the case where the required torque Tr has a positive value, the CPU core 11 reads out the correction parameter 2p for a positive torque from the parameter memory 13 to temporarily store the read correction parameter 2p in the work area (process for setting a correction parameter for a positive torque #2). In the correction parameter 2p for a positive torque, as discussed above, the phase difference parameter $\phi$ is "−60°" and the amplitude parameter A is "5.2%".

Next, the CPU core 11 executes a correction wave generation function for computing the following formula (2) on the basis of the set correction parameter 2h ($\phi$ and A) to generate a ripple correction wave $NTR_6$ (correction wave generation process #4).

$$NTR_6 = A \cdot Tr \cdot \sin(6\theta + \phi) = 0.052 Tr \cdot \sin(6\theta - 60) \quad (2)$$

Figure 7:
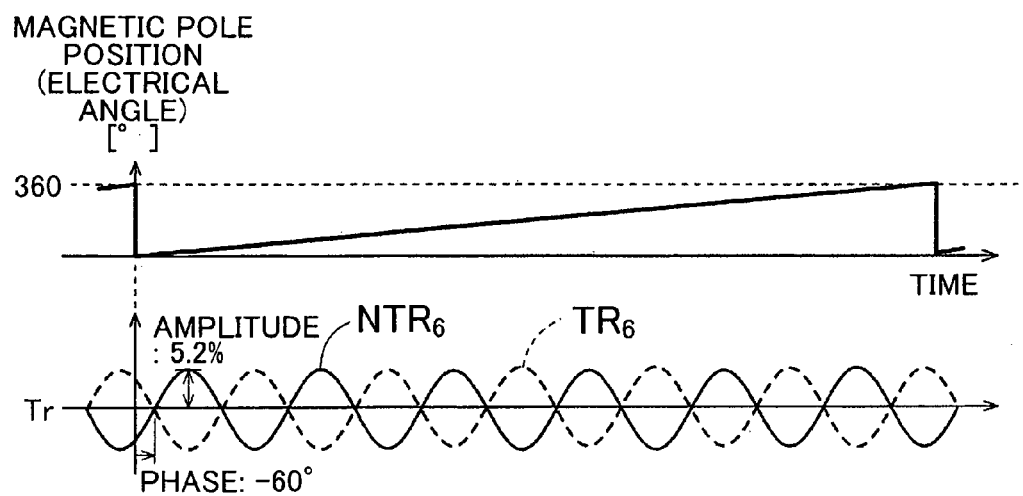
FIG. 7 is a waveform chart schematically showing a ripple correction wave at the time of positive torque.

Consequently, a ripple correction wave $NTR_6$ for a positive torque is generated as shown in FIG. 7. In the upper part of FIG. 7, the horizontal axis represents the time, and the vertical axis represents the electrical angle $\theta$ (magnetic pole position) of the AC fundamental wave which drives the motor M. FIG. 7 roughly corresponds to one cycle of the electrical angle $\theta$. In the lower part of FIG. 7, the sixth harmonic-wave component $TR_6$ of the torque ripple and the ripple correction wave $NTR_6$ are shown. A sinusoidal wave that has a phase delayed by 60°, in terms of the phase for sixth harmonic-wave components, from a reference phase which is set to a time at which the electrical angle $\theta$ is zero, and that has an amplitude of 5.2% of the required torque Tr is generated as the ripple correction wave $NTR_6$. The generated ripple correction wave $NTR_6$ is a sinusoidal wave at the opposite phase to the sixth harmonic-wave component $TR_6$ of the torque ripple. The torque ripple TR is suppressed by executing motor control computation discussed above on the basis of the target torque To obtained by superimposing the ripple correction wave $NTR_6$ on the required torque Tr.

In the case where the required torque Tr has a negative value, the CPU core 11 reads out the correction parameter 2n for a negative torque from the parameter memory 13 to temporarily store the read correction parameter 2n in the work area (process for setting a correction parameter for a negative torque #3). In the correction parameter 2n for a negative torque, as discussed above, the phase difference parameter $\phi$ is "−110°" and the amplitude parameter A is "5.0%". The CPU core 11 executes a correction wave generation function for computing the following formula (3) on the basis of the set correction parameter 2h ($\phi$ and A) to generate a ripple correction wave $NTR_6$ (correction wave generation process #4).

$$NTR_6 = A \cdot Tr \cdot \sin(6\theta + \phi) = 0.050 Tr \cdot \sin(6\theta - 110) \quad (3)$$

Figure 8:
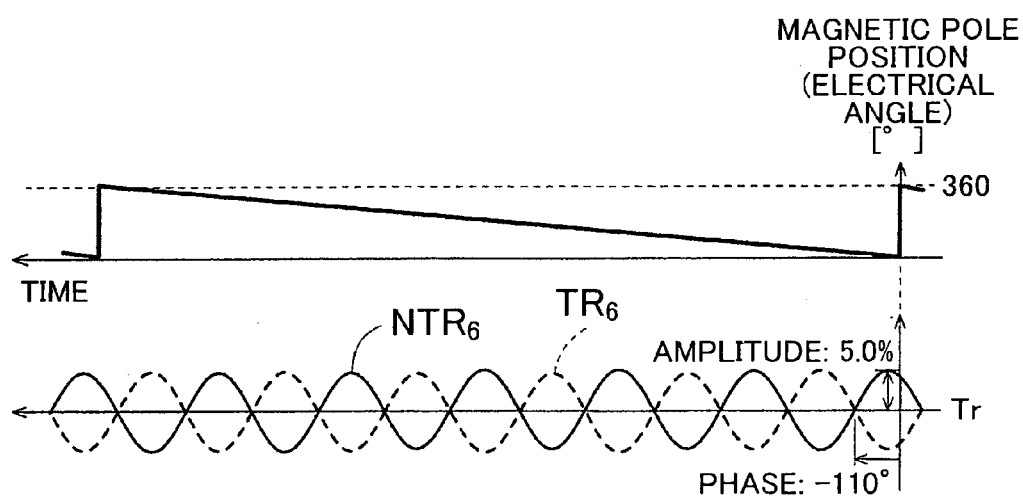
FIG. 8 is a waveform chart schematically showing a ripple correction wave at the time of negative torque.

Consequently, a ripple correction wave $NTR_6$ for a negative torque is generated as shown in FIG. 8. In the upper part of FIG. 8, as in FIG. 7, the horizontal axis represents the time, and the vertical axis represents the electrical angle $\theta$ (magnetic pole position) of the AC fundamental wave which drives the motor M. However, the direction of time passage along the time axis is opposite to FIG. 7. FIG. 8 roughly corresponds to one cycle of the electrical angle $\theta$ as with FIG. 7. In the lower part of FIG. 8, the sixth harmonic-wave component $TR_6$ of the torque ripple and the ripple correction wave $NTR_6$ are shown. A sinusoidal wave that has a phase delayed by 112°, in terms of the phase for sixth harmonic-wave components, from a reference phase which is set to a time at which the electrical angle $\theta$ is zero and that has an amplitude of 5.0% of the required torque Tr is generated as the ripple correction wave $NTR_6$. The generated ripple correction wave $NTR_6$ is a sinusoidal wave at the opposite phase to the sixth harmonic-wave component $TR_6$ of the torque ripple. The torque ripple TR is suppressed by executing motor control computation discussed above on the basis of the target torque To obtained by superimposing the ripple correction wave $NTR_6$ on the required torque Tr.

As a result of experiments performed by the inventors, it is also known that the torque ripple Tr exerts different influences on the occupants in accordance with the rotational speed of the motor M. Thus, preferably, the correction parameter setting section 2 further sets the amplitude of the ripple correction wave $NTR_6$ in accordance with the rotational speed of the motor M. In one embodiment, as shown in FIG. 2, the correction parameter setting section 2 may include a rotational speed filter 2r, and may set a speed coefficient kr according to the rotational speed (angular speed $\omega$) of the motor M as a correction parameter. Preferably, the rotational speed filter 2r is formed as a table that uses the rotational speed (angular speed $\omega$) of the motor M as an argument, for example, and is stored in the parameter memory 13. In the case where the speed coefficient kr is included in the correction parameter, the correction wave generation section 3 generates a ripple correction wave $NTR_6$ by the following formula (4).

$$NTR_6 = kr \cdot A \cdot Tr \cdot \sin(6\theta + \phi) \quad (4)$$

Figure 9:
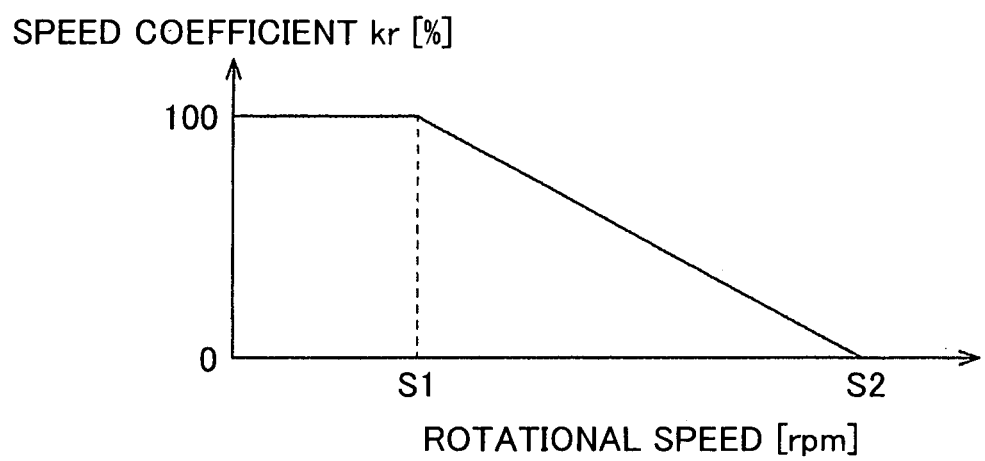
FIG. 9 is a characteristics chart for a speed coefficient for restricting the amplitude of a ripple correction wave.

The rotational speed filter 2r preferably has characteristics as shown in FIG. 9. In the graph shown in FIG. 9, the vertical axis represents the speed coefficient kr, and the horizontal axis represents the absolute value of the rotational speed of the motor M. When the rotational speed of the motor M is a predetermined restriction start speed S1 or lower, the amplitude of the ripple correction wave $NTR_6$ is not restricted. When the rotational speed of the motor M is higher than the predetermined restriction start speed S1, the amplitude of the ripple correction wave $NTR_6$ is restricted so as to become smaller as the rotational speed becomes higher until the amplitude of the ripple correction wave $NTR_6$ becomes zero at a restriction speed S2 higher than the restriction start speed S1. When the rotational speed of the motor M is equal to or higher than the restriction speed S2, the amplitude of the ripple correction wave $NTR_6$ is restricted to zero.

As a result of experiments performed by the inventors, it is known that the torque ripple Tr exerts less influence on the occupants, that is, the occupants sense less of the generated torque ripple Tr, as the rotational speed of the motor M becomes higher. Thus, preferably, the ripple correction wave $NTR_6$ with 100% of its amplitude is superimposed on the required torque Tr when the rotational speed of the motor M is the restriction start speed S1 or lower, the ripple correction wave $NTR_6$ is superimposed on the required torque Tr with the amplitude of the ripple correction wave $NTR_6$ gradually reduced as the rotational speed of the motor M becomes higher than the restriction start speed S1, and the ripple correction wave $NTR_6$ is not superimposed on the required torque Tr with the amplitude of the ripple correction wave $NTR_6$ kept at zero when the rotational speed of the motor M is higher than the restriction speed S2. When the thus configured rotational speed filter 2r is provided, it is possible to perform efficient control in which the torque ripple Tr is suppressed favorably during low-speed rotation and no unnecessary torque command is given during high-speed rotation. The speed coefficient kr varies gradually in accordance with the rotational speed. Therefore, the amplitude of the ripple correction wave $NTR_6$ does not vary abruptly to cause a discomfort to the occupants.

The correction parameter setting section 2 may further set the amplitude of the ripple correction wave $NTR_6$ in accordance with the required torque Tr for the motor M. That is, the correction parameter setting section 2 may include a torque filter (not shown) to set a torque coefficient kt according to the required torque Tr as the correction parameter 2h. In the case where the torque coefficient kt is included in the correction parameter, the correction wave generation section 3 generates a ripple correction wave $NTR_6$ by the following formula (5).

$$NTR_6 = kt \cdot kr \cdot A \cdot Tr \cdot \sin(6\theta + \phi) \quad (5)$$

Figure 10:
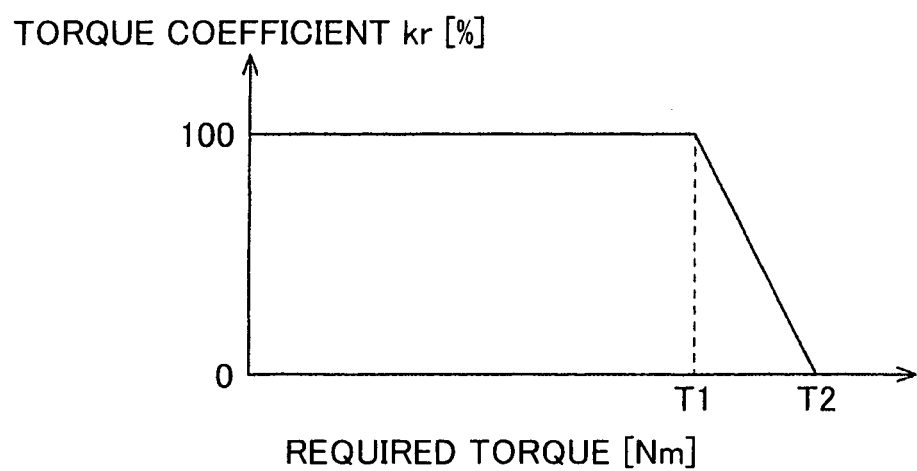
FIG. 10 is a characteristics chart for a torque coefficient for restricting the amplitude of a ripple correction wave.

The torque filter preferably has characteristics as shown in FIG. 10, as with the rotational speed filter 2r. In the graph shown in FIG. 10, the vertical axis represents the torque coefficient kt, and the horizontal axis represents the absolute value of the required torque. When the required torque Tr for the motor M is a predetermined restriction start torque T1 or lower, the amplitude of the ripple correction wave $NTR_6$ is not restricted. When the required torque Tr is higher than the predetermined restriction start torque T1, the amplitude of the ripple correction wave $NTR_6$ is restricted so as to become smaller as the required torque Tr becomes higher until the amplitude of the ripple correction wave $NTR_6$ becomes zero at a restriction torque T2 higher than the restriction start torque T1. When the required torque Tr is equal to or higher than the restriction torque T2, the amplitude of the ripple correction wave $NTR_6$ is restricted to zero.

If the ripple correction wave $NTR_6$ is superimposed on the required torque Tr when the required torque Tr is close to the restriction torque T2 for the motor M, the instantaneous value of the target torque To may reach or exceed the restriction torque T2. This may result in a restriction on the target torque To or the target currents id and iq, which may cause other pulsations. Thus, it is preferable to set as the restriction torque T2 the center of amplitude at which the instantaneous value of the ripple correction wave $NTR_6$ does not reach the restriction torque with a sufficient margin, and to gradually reduce the amplitude of the ripple correction wave $NTR_6$ from the restriction start torque T1 to the restriction torque T2. When the required torque Tr for the motor M is the restriction start torque T1 or lower, the ripple correction wave $NTR_6$ with 100% of its amplitude is superimposed on the required torque Tr. The torque coefficient kt varies gradually in accordance with the required torque Tr. Therefore, the amplitude of the ripple correction wave $NTR_6$ does not vary abruptly to cause a discomfort to the occupants.

In the present invention, the correction parameter is set depending on whether the required torque Tr is positive or negative. The correction parameter includes the phase difference $\phi$. Therefore, the ripple correction wave $NTR_6$ is significantly different depending on whether the required torque Tr is positive or negative. For example, in the case where the sign of the required torque Tr is abruptly inverted between plus and minus, the ripple correction wave $NTR_6$ may vary significantly to cause a discomfort to the occupants. Therefore, a hysterisis is often set in control that involves determination between positive and negative. In the present invention, however, it is not necessary to set such a hysterisis for a reason given below. Thus, it is possible to form the control device 100 which has a concise configuration and which can immediately follow changes in sign of the required torque Tr between plus and minus.

One example with a practical value is taken for verification. The torque accuracy which is the difference of the actual torque from the required torque Tr is generally ±1.5 [Nm]. That is, the sign of the torque may be inversed between positive and negative in a range where the required torque Tr is ±1.5 [Nm]. However, there also exists a running resistance of the vehicle which is about ±5 [Nm]. Therefore, the vehicle is stationary in the range where the required torque Tr is ±1.5 [Nm]. Thus, because a state in which the vehicle is stationary substantially serves as a hysterisis, it is not necessary for the positive/negative determination section 1 to determine whether the required torque Tr is positive or negative in consideration of a hysterisis. As a result, a very concise system can be constructed.

OTHER EMBODIMENTS

In the above embodiment, as shown in FIG. 2, it is determined whether the torque is positive or negative on the basis of the required torque Tr. However, it may be determined whether the torque is positive or negative on the basis of a torque actually output from the motor M or a torque estimated on the basis of a current value or the like. Such torques and the required torque Tr correspond to the output torque of the present invention.

Also in the above embodiment, as shown in FIG. 2, the ripple correction wave $NTR_6$ is superimposed on the required torque Tr. However, the present invention is not limited thereto, and the ripple correction wave $NTR_6$ may be superimposed on a current command computed on the basis of the required torque Tr (torque command).

The present invention may be applied to a rotary electric machine control device that controls driving of a motor (rotary electric machine) that drives a vehicle such as a hybrid vehicle or an electric vehicle on the basis of a target torque and a rotational speed.

What is claimed is:

1. A rotary electric machine control device that controls driving of a rotary electric machine that drives a vehicle, comprising:
    a positive/negative determination section that determines whether an output torque of the rotary electric machine is positive or negative;
    a correction parameter setting section that sets as a correction parameter a phase difference of a sinusoidal ripple correction wave for reducing torque ripple of the rotary electric machine with respect to a magnetic pole position of the rotary electric machine depending on whether the output torque is positive or negative; and
    a correction wave generation section that generates the ripple correction wave on the basis of the correction parameter,
    wherein the rotary electric machine is controlled to drive using the ripple correction wave.

2. The rotary electric machine control device according to claim 1, further comprising:
    a required torque setting section that determines a required torque for the rotary electric machine on the basis of at least an operation amount of an accelerator pedal,
    wherein the rotary electric machine is controlled to drive on the basis of a target torque obtained by superimposing the ripple correction wave on the required torque.

3. The rotary electric machine control device according to claim 2, wherein the correction parameter setting section further sets an amplitude of the ripple correction wave depending on whether the output torque is positive or negative.

4. The rotary electric machine control device according to claim 2, wherein the correction parameter setting section sets the amplitude of the ripple correction wave in accordance with a rotational speed of the rotary electric machine.

5. The rotary electric machine control device according to claim 4, wherein the correction parameter setting section restricts the amplitude of the ripple correction wave such that the amplitude of the ripple correction wave becomes smaller as the rotational speed of the rotary electric machine becomes higher since the rotational speed exceeds a restriction start speed until the amplitude of the ripple correction wave becomes zero at a restriction speed set higher than the restriction start speed, and such that the amplitude of the ripple correction wave is restricted to zero when the rotational speed of the rotary electric machine is equal to or higher than the restriction speed.

6. The rotary electric machine control device according to claim 1, wherein the correction parameter setting section further sets an amplitude of the ripple correction wave depending on whether the output torque is positive or negative.

7. The rotary electric machine control device according to claim 6, wherein the correction parameter setting section sets the amplitude of the ripple correction wave in accordance with a rotational speed of the rotary electric machine.

8. The rotary electric machine control device according to claim 7, wherein the correction parameter setting section restricts the amplitude of the ripple correction wave such that the amplitude of the ripple correction wave becomes smaller as the rotational speed of the rotary electric machine becomes higher since the rotational speed exceeds a restriction start speed until the amplitude of the ripple correction wave becomes zero at a restriction speed set higher than the restriction start speed, and such that the amplitude of the ripple correction wave is restricted to zero when the rotational speed of the rotary electric machine is equal to or higher than the restriction speed.

9. The rotary electric machine control device according to claim 1 wherein the correction parameter setting section sets the amplitude of the ripple correction wave in accordance with a rotational speed of the rotary electric machine.

10. The rotary electric machine control device according to claim 9, wherein the correction parameter setting section restricts the amplitude of the ripple correction wave such that the amplitude of the ripple correction wave becomes smaller as the rotational speed of the rotary electric machine becomes higher since the rotational speed exceeds a restriction start speed until the amplitude of the ripple correction wave becomes zero at a restriction speed set higher than the restriction start speed, and such that the amplitude of the ripple correction wave is restricted to zero when the rotational speed of the rotary electric machine is equal to or higher than the restriction speed.

* * * * *